United States Patent [19]

Murray et al.

[11] 4,363,610
[45] Dec. 14, 1982

[54] APPARATUS FOR CONTINUOUSLY MOLDING CYLINDRICAL BLOCKS OF FOAMED POLYMERIC MATERIAL

[75] Inventors: Bruce A. Murray, Dollard des Ormeaux; Peter H. Hasler; Augustin Roth, both of St. Leonard, all of Canada

[73] Assignee: Miller Foam Enterprises, Inc., Montreal, Canada

[21] Appl. No.: 228,582

[22] Filed: Jan. 26, 1981

[51] Int. Cl.³ .................... B29D 27/04; B29C 1/04
[52] U.S. Cl. ...................................... 425/89; 264/51; 264/DIG. 84; 425/224; 425/817 C
[58] Field of Search .................. 264/54, DIG. 84, 51; 425/89, 224, 817 C

[56] References Cited

U.S. PATENT DOCUMENTS

| | | | |
|---|---|---|---|
| 3,281,894 | 11/1966 | Buff et al. | 264/DIG. 84 |
| 3,296,658 | 1/1967 | Buff et al. | 264/DIG. 84 |
| 3,726,623 | 4/1973 | Ferstenberg | 264/DIG. 84 |
| 3,729,534 | 4/1973 | Ferstenberg | 264/DIG. 84 |
| 3,786,122 | 1/1974 | Berg | 264/DIG. 84 |
| 3,832,099 | 8/1974 | Berg | 264/DIG. 84 |
| 3,840,629 | 10/1974 | Marjoram | 264/54 |
| 4,026,979 | 3/1977 | Palomares | 264/DIG. 84 |
| 4,093,109 | 6/1978 | Schrader | 264/DIG. 84 |

*Primary Examiner*—Philip E. Anderson
*Attorney, Agent, or Firm*—Swabey, Mitchell, Houle, Marcoux & Sher

[57] ABSTRACT

An apparatus for making cylindrical polyurethane foam blocks, including an upstanding trough with a weir structure at the upstream end of a fall plate in a molding apparatus, means for passing a first web of a separation sheet below the trough and between a gap formed between the weir and the fall plate leading edge, means for forming the first web into a U-shaped configuration as it advances with the foaming material, and second means for feeding opposite webs of sheet material immediately upstream of the conveyor through molding means for forming the cylindrical block.

6 Claims, 6 Drawing Figures

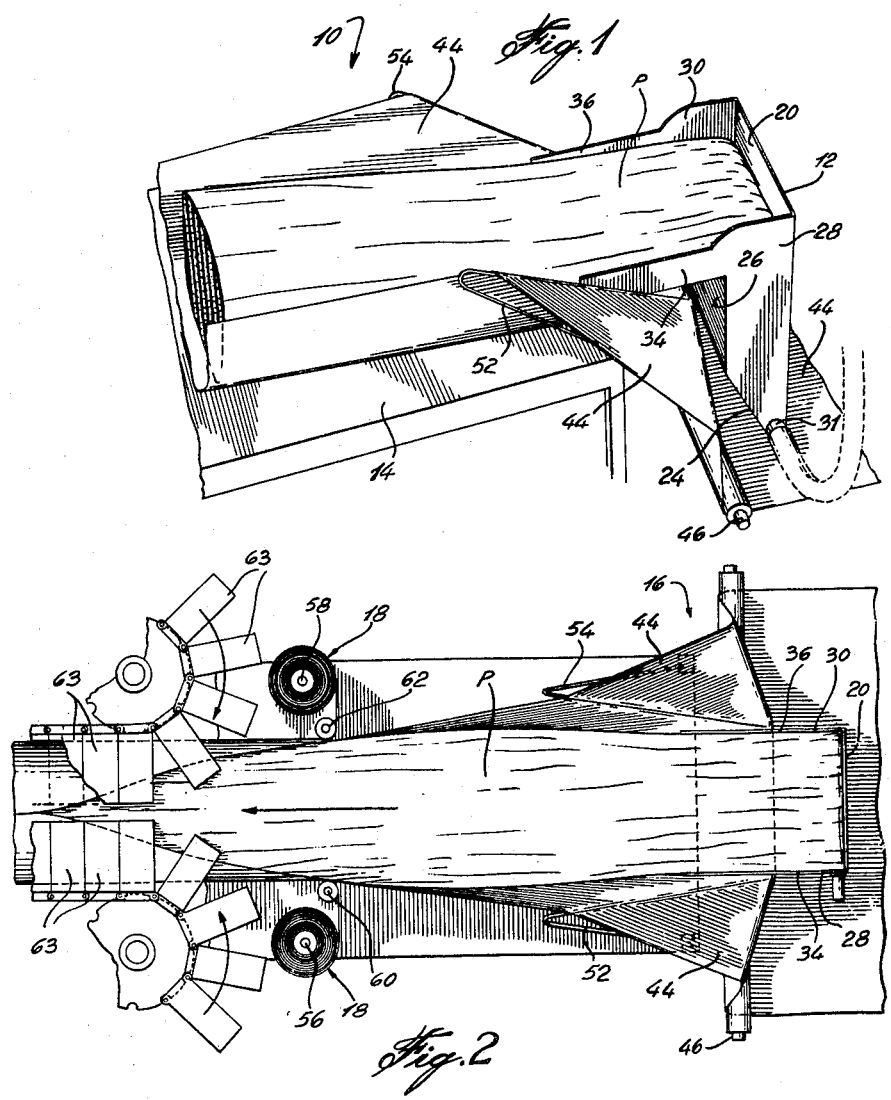

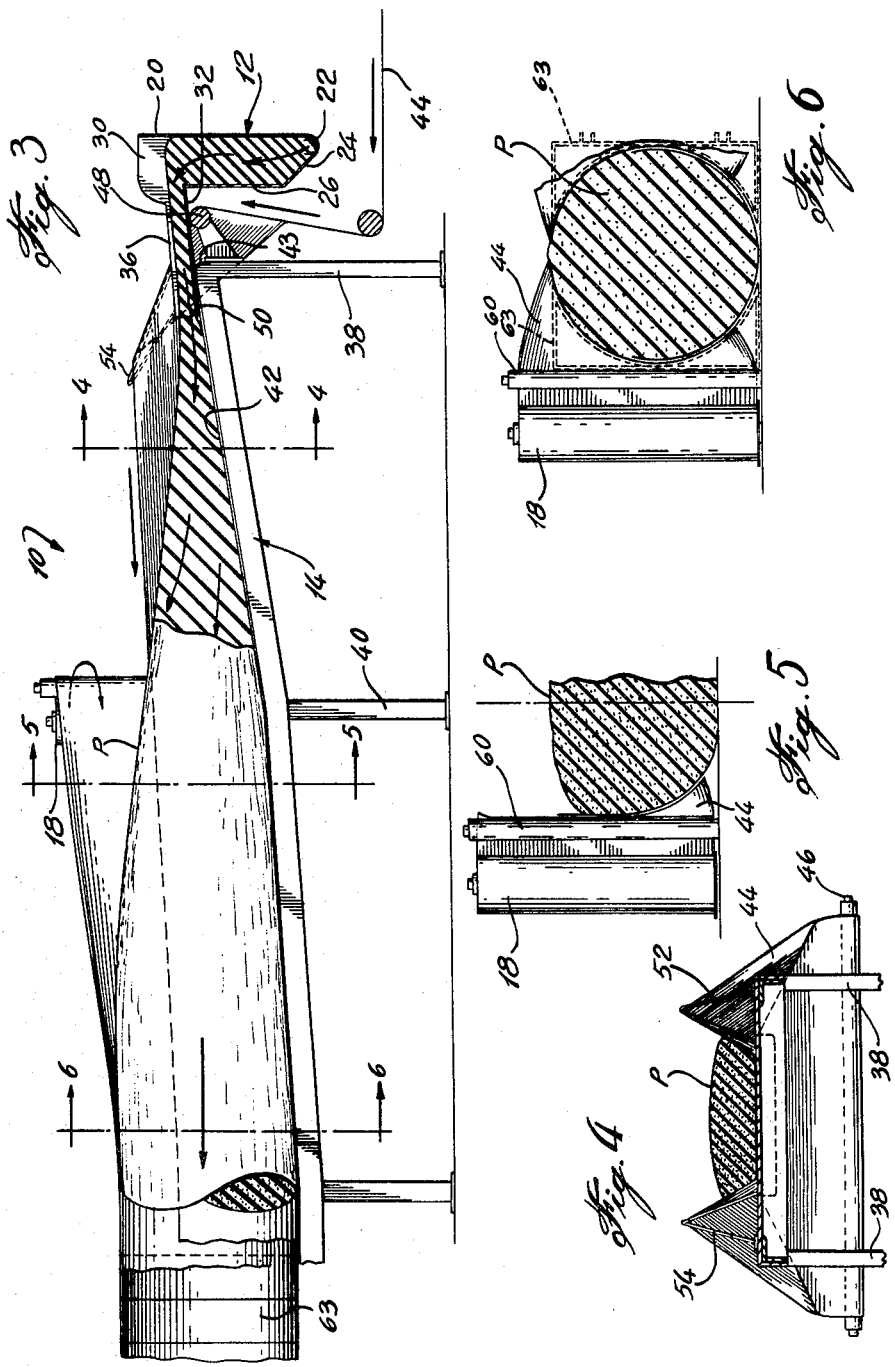

APPARATUS FOR CONTINUOUSLY MOLDING CYLINDRICAL BLOCKS OF FOAMED POLYMERIC MATERIAL

BACKGROUND OF THE INVENTION

1. Field of the Invention

The present invention relates to an apparatus for continuously molding cylindrical blocks of foamed polymeric material, and more particularly, foamed polyurethane blocks for subsequent conversion into sheeting by a process of peeling.

2. Description of the Prior Art

It is known to produce sheets of foamed polyurethane for use as carpet backing, laminate lining in clothing, etc., by first producing blocks of foamed polyurethane in cylindrical shape and then peeling a sheet from the cylindrical blocks, thus reducing waste. The foamed polyurethane blocks are formed by depositing liquid foam reactants on an inclined conveying surface and gradually forming the cylinder as the foam is allowed to rise freely by means of a conveyor made up of arcuate mold sections moving along with the conveyor. Examples of such apparatuses and processes are found in U.S. Pat. Nos. 3,281,894, issued Nov. 1, 1966 to Fred Buff et al; 3,296,658, issued Jan. 10, 1967, also to Fred Buff et al; 3,726,623, issued Apr. 10, 1973 to C. Ferstenberg; 3,729,534, issued Apr. 24, 1973, also to C. Ferstenberg; and 3,840,629, issued Oct. 8, 1974 to J. E. Marjoram.

Because of the unusual length required to mold large polyurethane blocks, it is of advantage to find a way to reduce the amount of molding length that is required to form such large diameter blocks. A good discussion of the problems of the dimensions involved is found in U.S. Pat. No. 3,786,122, issued Jan. 15, 1974 to L. Berg. His solution in relation to reducing the length of the conveyor and to overcoming the need for complicated feed head arrangements is discussed in this patent as well as in his U.S. Pat. No. 3,832,099, issued Aug. 27, 1974. In both these patents, Berg suggests providing an upright molding trough at the leading edge of the conveyor. The trough is of rectangular cross-section, and a weir structure is provided in which an initial rectangular shape is given to the expanding foam polyurethane as it flows onto the conveyor. U.S. Pat. No. 4,093,109, issued June 6, 1978 to M. J. Schrader, is also directed to such an apparatus.

It would be of advantage to be able to apply the trough of Berg to the apparatus for forming blocks of cylindrical shape as described in the aforementioned patents. However, the preforming trough of Berg is by its very shape suitable for forming rectangular blocks.

SUMMARY OF THE INVENTION

It is an aim of the present invention to provide an apparatus for forming cylindrical blocks of polymeric foam, including an upstanding trough for preforming the polymeric foam.

It is a further aim of the present invention to provide an improved upstanding trough for preforming the polymeric foam.

An apparatus in accordance with the present invention comprises an upright trough, a weir including a flange extending from an upper edge of the trough, means for feeding a first web in a flattened condition immediately below the flange in a flat plane for receiving freely expanding polymeric foam exuding from the trough over the flange, means for supporting the web below and downstream of the flange, means for first shaping the web to have a channel shape in a first stage, means for succeedingly shaping the web to have a U-shaped curvilinear cross-section in a second stage, means for feeding a pair of opposite wall forming webs merging with the first web, means for succeedingly shaping the first web and the merging pair of webs to have a circular cross-section in a third stage, and means for advancing the webs and the so-formed cylindrical polymeric foam member.

In another aspect of the present invention, an upstanding trough for preforming a mixture of polymeric foam reagents in a continuous foam block molding apparatus comprises an upstanding trough of rectangular cross-section having a longitudinal axis extending at right angles to the molding direction, the trough having an upwardly widening cavity terminating in a mouth having a flat flange along one longitudinal edge and directed towards the molding direction, the bottom of said trough having a uniform arcuate cross-section in a lateral plane, and a feed inlet having an axis parallel to the longitudinal axis of the trough, the feed inlet provided at the bottom of the trough and having a diameter generally the same as the diameter of the arcuate cross-section of the bottom of the trough whereby the reagents are fed into the trough with a minimum of turbulence.

BRIEF DESCRIPTION OF THE DRAWINGS

Having thus generally described the nature of the invention, reference will now be made to the accompanying drawings, showing by way of illustration, a preferred embodiment thereof, and in which:

FIG. 1 is a fragmentary perspective view of the upstream end of the foam molding apparatus;

FIG. 2 is a top plan view of a detail shown in FIG. 1;

FIG. 3 is a fragmentary side elevation, partly in cross-section, of the upstream portion of the foam molding apparatus;

FIG. 4 is a vertical cross-section taken along line 4—4 of FIG. 3;

FIG. 5 is a fragmentary vertical cross-section taken along line 5—5 of FIG. 3; and FIG. 6 is a vertical cross-section taken along line 6—6 of FIG. 3.

DESCRIPTION OF THE PREFERRED EMBODIMENTS

Referring now to the drawings, a portion of the foam molding apparatus 10 is illustrated. The downstream section of the molding apparatus 10, which is not shown in the drawings, is conventional. Generally, a molding apparatus for polymeric foam includes a fall plate which is at an angle to the horizontal, a paper web feeding device for supplying a separation sheet surrounding the foaming polymeric material, and a conveyor of considerable length including shape-forming mold elements thereon for forming the contour of the block as it is being foamed and for drawing the separation sheet surrounding the block. The drawings of the present specification illustrate the upstream end of such a molding apparatus, including a prefoaming trough 12 for feeding the polymeric material P onto the fall plate 14 and including the initial web feeding apparatus 16 and 18.

The trough 12 includes a rear wall 20, a bottom wall 22, an upwardly sloping wall 24 and a front wall 26. The front wall 26 is of reduced height compared to the rear wall 20 and terminates in a downstream extending flat flange 32 forming the weir. The trough 12 also has end walls 28 and 30. End walls 28 and 30 extend to the same height as rear wall 20 and includes forwardly projecting extensions 34 and 36 which are integral with opposed edges of the flange 32. The trough 12 also includes an inlet 31 through which the reagents are fed into the trough 12. The inlet 31 is strategically located in end wall 28, and at the bottom of the trough adjacent the bottom wall 22. The bottom wall 22 has a curvature generally of the same diameter as the diameter of the inlet pipe 31.

The fall plate 14 includes a table supported by support legs 38 and 40, and the table includes a fall plate surface 42 set at an angle to the horizontal. The setting of the angle of the fall plate is based on well-known criteria, including conveyor velocity characteristics of the foaming reagents, etc.

A paper feed supply (not shown) is positioned behind the rear wall 20 of the trough 12. The paper web 44 is drawn below the trough 12 about the roller 46. The paper is then drawn over roller 48 which is immediately below the flange 32 and aligns the paper with the surface 42 of the fall plate 14. The paper passes through the gap 50 formed between the flange 32 and the leading edge 43 of the fall plate surface 42. A pair of wire frames 52 and 54 are provided on either side of the weir structure formed by the flange 32 to initially form the paper web which is coming off a flat paper roll, into a generally U-shaped cross-section. The roll 48 has a length which is shorter than the width of the paper web 44, and the wire frame members 52 and 54 are arranged to engage the paper web 44 immediately adjacent the ends of the roll 48 so as to begin the formation of the U-shaped cross-section of the web 44 and to avoid the creation of wrinkles in the paper web. The wire frame members each include diverging arms which direct the paper web as shown.

Downstream of the wire members 52 and 54, there is provided paper supply rolls 56 and 58 from which second and third webs are drawn and pulled over the idlers 60 and 62 respectively. The side and bottom conveyors, including the mold members 63, immediately engage the three paper webs and the foaming material P downstream of the paper supply rolls 56 and 58 so as to mold the foam product into a cylindrical form and to draw the paper web and the foam product down the foaming zone on the conveyor. The side molds could also be stationary, and the paper webs could be pulled therethrough.

In operation, the foaming reagents are fed under controlled conditions through the inlet 31 into the trough 12. The location of the inlet 31, that is, at one end of the trough and near the bottom wall 22, allows the reagents to enter the trough with a minimum of turbulence as the liquid reagents can flow along the bottom curved wall through the whole length of the trough 12. This is contrasted to earlier trough designs where the inlet was usually placed on the rear wall of the trough such that the reagents immediately encountered the opposite front wall of the trough causing the flow of reagents to be erratic and form turbulence, thus allowing uneven foaming in the trough.

The reagents begin their foaming action within the trough 12, and foaming material P passes over the weir and immediately flows onto the first paper web 44 as it advances between the wire forms 52 and 54 in a U-shaped cross-section. As the material P advances, the second and third webs 57 and 59 encounter and overlap the first web 44, and the whole enters the conveyor molding apparatus downstream of the supply rolls 56 and 58 for forming and molding.

We claim:

1. An apparatus for forming cylindrical foam polymeric blocks, comprising an upright prefoaming trough, a weir including a flange extending from an upper edge of the trough, means for feeding a first web in a flattened condition immediately below the flange in a flat plane for receiving freely expanding polymeric foam exuding from the trough over the weir, means for supporting the web below and downstream of the flange, means for first shaping the web to have a channel shape in a first stage, means for succeedingly shaping the web to have a U-shaped curvilinear cross-section in a second stage, means for feeding a pair of opposite wall forming webs merging with the first web, means for succeedingly shaping the first web in the merging pair of webs to have a circular cross-section in a third stage, and means for advancing the webs and the so-formed cylindrical polymeric foam block.

2. An apparatus as defined in claim 1, wherein the means for feeding a first web in a flattened condition includes a conveyor downstream thereof drawing a paper web from a paper supply roll, the paper supply roll being placed upstream and behind the upright trough, roller means provided to supply the first paper web below the trough upwardly to pass underneath the flange forming the weir, and web support means on either side of the weir for preforming the first paper web into a channel-shaped mold.

3. An apparatus as defined in claim 2, wherein the means for supporting the first web on either side of the weir includes wire frame members extending on either side of an idler roller located immediately below the flange forming the weir, each of the wire frame members having first and second arms extending outwardly therefrom for allowing the paper web to pass thereover and form into a channel shape with a minimum of wrinkles.

4. An apparatus as defined in claim 1, wherein the means for succeedingly shaping the web to form a U-shaped curvilinear cross-section includes mold members having arcuate shaped mold surfaces, mounted on the conveyor means.

5. An apparatus as defined in claim 1, wherein means for feeding a pair of opposite wall forming webs include the conveyor means for drawing the paper webs and supply rolls on either side of the advancing foaming material on the fall plate, and means for shaping the opposite pair of webs including the mold members on the conveyor.

6. An apparatus for continuously manufacturing a foam block, including an upstanding trough for preforming a mixture of polymeric foam reagents, the trough being of rectangular cross-section and having a longitudinal axis extending at right angles to the molding direction, the trough having an upwardly widening cavity terminating in a mouth having a flat flange along one longitudinal edge and directed toward the molding direction; the bottom of the trough having a uniform arcuate cross-section in a lateral plane, and a feed inlet having an axis parallel to the longitudinal axis of the trough, the feed inlet provided at the bottom of the trough and having a diameter generally the same as the diameter of the arcuate cross-section of the bottom of the trough whereby the reagents are fed into the trough with a minimum of turbulence.

* * * * *